United States Patent [19]
Dunn et al.

[11] Patent Number: 5,980,076
[45] Date of Patent: Nov. 9, 1999

[54] ILLUMINATOR FOR FIBER OPTIC LIGHTING SYSTEM

[75] Inventors: Dennis C. Dunn, Thousand Oaks; Kevin L. Potucek, Simi Valley; Richard L. Swain, Simi Valley; Laurence E. Thrasher, Simi Valley, all of Calif.

[73] Assignee: American Products, Inc., Moorpark, Calif.

[21] Appl. No.: 08/731,797

[22] Filed: Oct. 18, 1996

[51] Int. Cl.$^6$ ...................................................... F21V 7/04
[52] U.S. Cl. ...................... 362/562; 362/554; 362/367; 362/374; 362/375; 362/101; 362/207
[58] Field of Search .................... 362/551, 559, 362/562, 362, 367, 374, 375, 101, 207; 96/901, 154; 215/329

[56] References Cited

U.S. PATENT DOCUMENTS

| | | | |
|---|---|---|---|
| 3,609,343 | 9/1971 | Howlett | 240/10 |
| 3,749,907 | 7/1973 | Clough | 240/2 |
| 3,830,395 | 8/1974 | Crisci | 215/321 |
| 4,718,571 | 1/1988 | Bordner | 220/270 |
| 5,548,495 | 8/1996 | Maglica | 362/207 |

*Primary Examiner*—Nimeshkumar D. Patel
*Assistant Examiner*—Michael J. Smith
*Attorney, Agent, or Firm*—Pretty, Schroeder & Poplawski, P.C.

[57] ABSTRACT

An illuminator assembly that has a lid that can be easily removed, a spare bulb holder, a color wheel that easily accepts additional filters without disassembly and a snap on filter for a window on the illuminator assembly. The illuminator assembly illuminates one end of a bundle of fiber optic fibers for a lighting system for a swimming pool or a spa or other area to be illuminated. The illuminator assembly includes a hollow housing containing a light socket assembly for illuminating the end of the bundle of fiber optic fibers. The housing has a first tab mounted adjacent to its open upper end. A light bulb is mounted in the light socket assembly and a lid is provided that is sized to cover the open upper end of the housing. The lid has a second tab configured to selectively engage the first tab on the housing upon the rotation of the lid with respect to the housing. The interlocking tabs advantageously allow the installation and removal of the lid without the removal and replacement of troublesome mechanical fasteners, such as screws, nuts and bolts or the use of tools for these fasteners. As described above, the invention also provides other advantageous features.

17 Claims, 6 Drawing Sheets

ILLUMINATOR FOR FIBER OPTIC LIGHTING SYSTEM

BACKGROUND OF THE INVENTION

The invention relates generally to lighting for swimming pools and spas, and, more particularly, to light sources for fiber optic lighting systems for swimming pools, spas and the like.

Submersible electric lights for the illumination of swimming pools and spas have become well known over the years. More recently, it has become popular to use fiber optics in swimming pool lighting systems. In one particular system, a remote light source, known as an illuminator, is used to provide light to bundles of fiber optic fibers that run from the light source to lens assemblies mounted under the waterline in the wall of a swimming pool. The illuminator has a generally cylindrical shape and has a light bulb located in its upper portion. The top, or lid, of the illuminator can be separated by removing mounting screws, thereby revealing a light source assembly that includes a light bulb socket and the light bulb directing light through a wheel with colored filters mounted thereon. The fiber optic bundles are mounted under the color wheel in the path of the light from the light bulb.

While the aforementioned arrangement is generally acceptable, it has drawbacks under certain conditions. One particular problem is associated with the difficulty of removal of the lid of the illuminator. In this regard, the pool owner must remove mounting screws to remove the lid of the illuminator to gain access to the light bulb for purposes of bulb replacement. The process of removing the screws is awkward and difficult, especially if performed in the dark, when the pool owner is likely to realize the need for a new bulb. Further, during the disassembly process, some of the screws may become lost and require replacement.

Another drawback associated with the conventional illuminator is that it does not provide a secure storage location for a spare light bulb. Thus, when the bulb burns out, the consumer cannot immediately replace the bulb unless he or she has stored a spare bulb somewhere else. If no spare bulb is close by, the pool lighting system cannot be operated until another bulb is purchased by the pool owner.

Yet another drawback is associated with the color wheel in the illuminator. If the pool owner wishes to install a custom color filter in the wheel, disassembly of the color wheel is required. This is a complex and disfavored method for the pool owner or a professional installer to permanently add another color filter to the existing set of filters mounted under the light bulb of the illuminator.

Yet a final drawback is associated with the waste, or by-product, light from the light bulb. The illuminator often includes a transparent or translucent window located under the lid or immediately around the light bulb. Because all of the bulb's light does not travel through the fiber optic bundles, some light is reflected through the window and can be used to light a walkway or a portion of a landscape. However, under certain circumstances, such as when the illuminator is mounted close to a spa, the pool owner may desire to reduce or eliminate the light from the window in the illuminator. To accomplish this task, a colored or opaque filter may be mounted on the window, but only again with the hassle of using tools to remove and reinstall troublesome mechanical fasteners.

It should therefore be appreciated that there is a need for an improved illuminator that addresses the drawbacks identified above. The present invention fulfills this need.

SUMMARY OF THE INVENTION

The present invention provides an illuminator assembly that has a lid that can be easily removed, a spare bulb holder, a color wheel that easily accepts additional filters and a snap on filter for a window on the housing assembly. The illuminator assembly illuminates one end of a bundle of fiber optic fibers for a lighting system for a swimming pool or a spa or the like.

The illuminator assembly includes a hollow housing containing a light socket assembly for illuminating the end of the bundle of fiber optic fibers. The housing has an open upper end with the light socket assembly therein and further includes a first tab mounted adjacent to its open upper end. A light bulb is mounted in the light socket assembly and a lid is provided that is sized to cover the open upper end of the housing. A first feature of the invention is related to the lid, which has a second tab configured and located to selectively engage the first tab on the housing upon the rotation of the lid with respect to the housing. The interlocking tabs advantageously allow the installation and removal of the lid without the removal and replacement of mechanical fasteners, such as screws, nuts and bolts. A further related advantage is that the lid can be re-installed without the use of any tools required for such fasteners.

Another feature of the invention is a spare bulb holder mounted inside of the housing assembly. In a detailed aspect of the invention, the spare bulb holder can have two opposing side walls that are positioned to converge upon one another to hold a spare light bulb therebetween. This feature of the invention advantageously provides for a convenient storage space for a spare light bulb. Thus, the pool owner can immediately replace the light bulb in the light source housing assembly when it burns out.

Yet another feature of the present invention is the color wheel that is mounted within the illuminator and located between the light bulb and the fiber optic cable bundle. The color wheel has two hubs that have peripheral edges that are spaced apart to easily accept color filters therebetween. Thus, this feature allows for the quick and easy installation of custom color filters without the removal and replacement of mechanical fasteners.

A final feature of the invention is a filter that snaps around a window located in the illuminator assembly. The filter has a wall with a longitudinal notch. The wall is sized to fit over the window and is elastically deformable so that the wall can be opened at the notch to pass around the window. The filter resumes its original shape around the window and thus advantageously is installable on the window without the use of troublesome mechanical fasteners or tools.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

The following drawings illustrate the preferred embodiment of the invention. In such drawings.

DESCRIPTION OF THE PREFERRED EMBODIMENT

Figure 1:
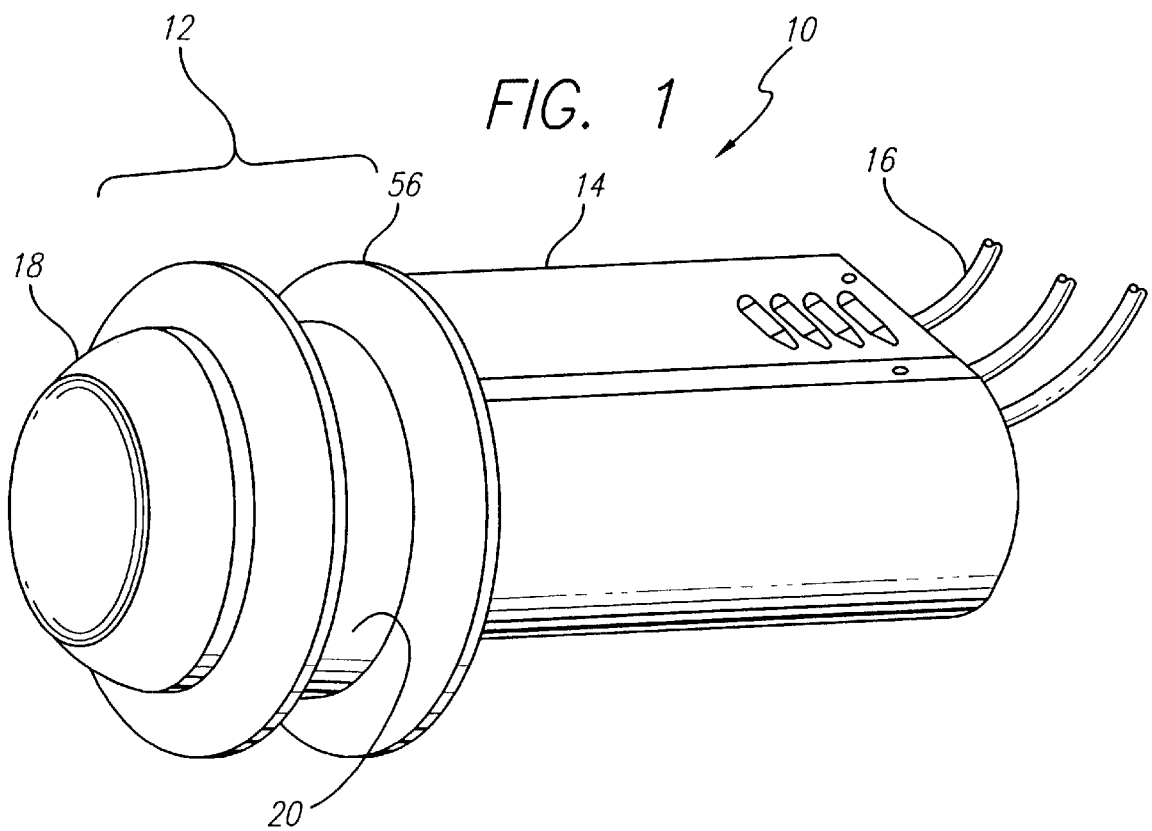
FIG. 1 is a perspective view of a illuminator according to the invention.
Figure 2:
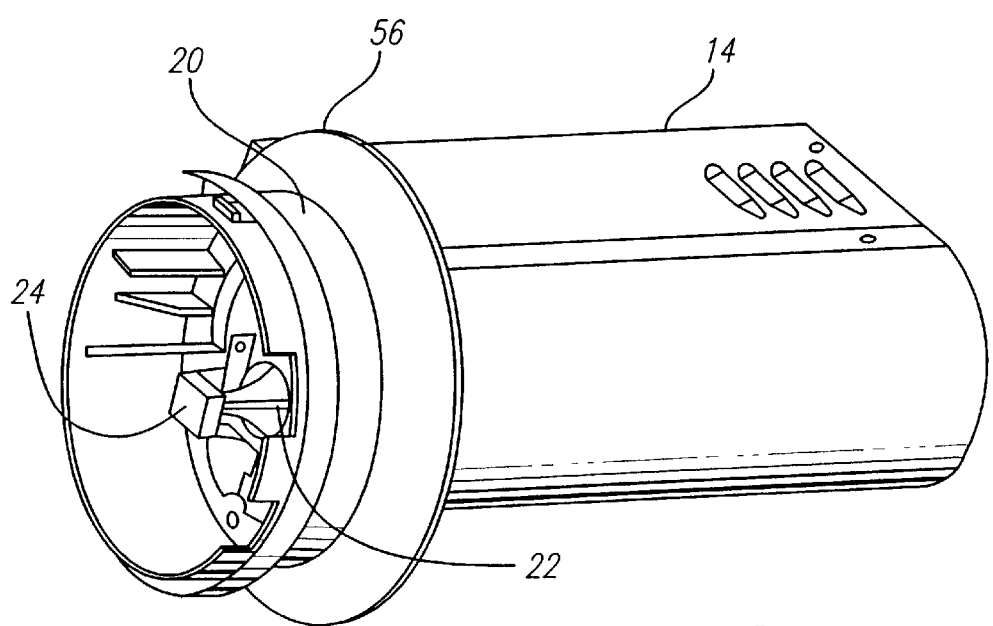
FIG. 2 is a perspective view of the illuminator of FIG. 1, without its lid.
Figure 3:
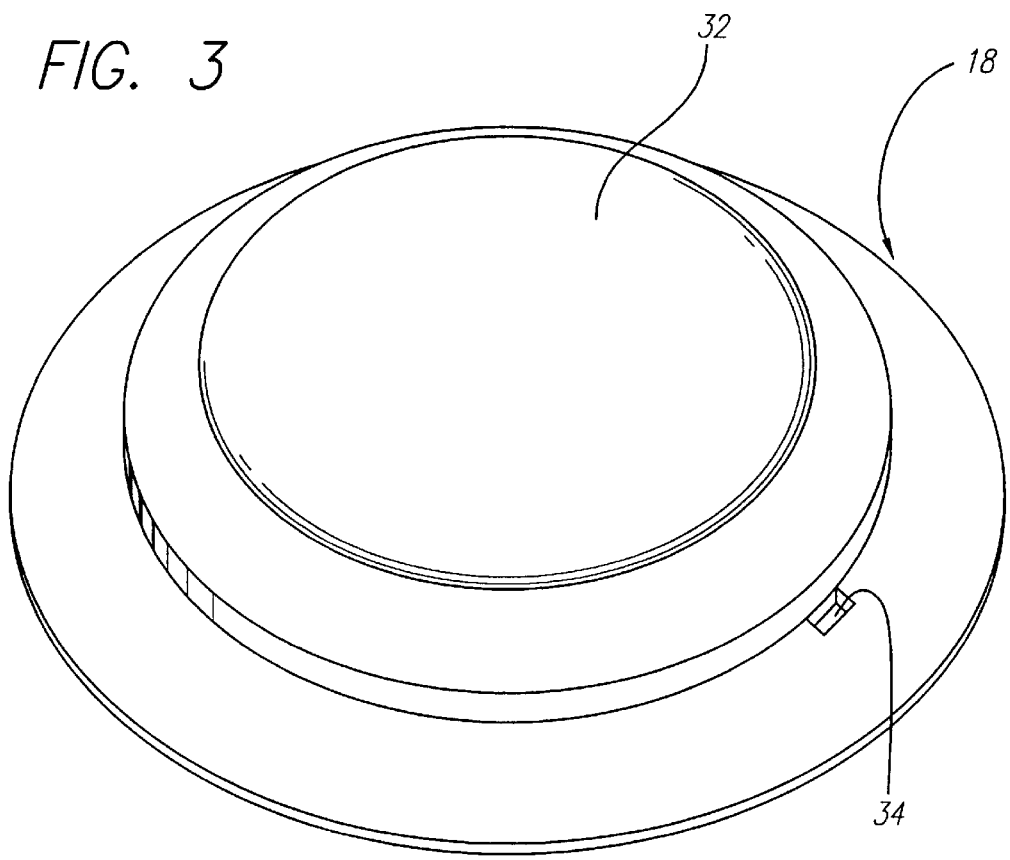
FIG. 3 is a perspective view of the lid of the illuminator assembly of FIG. 1.
Figure 4:
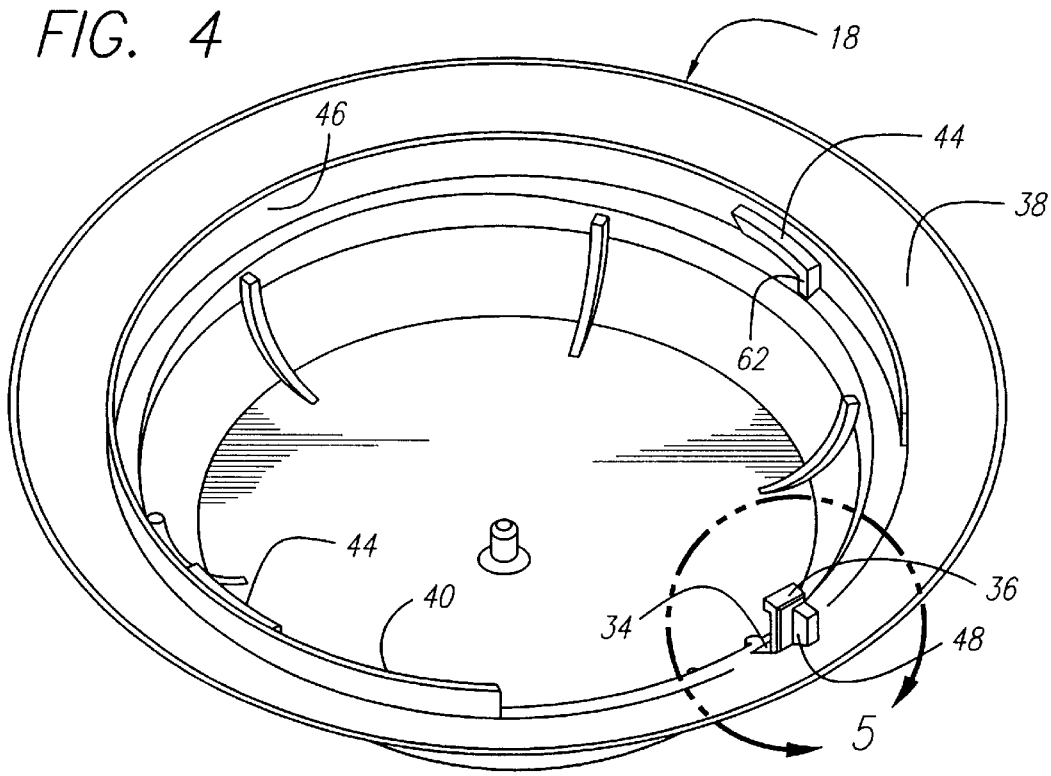
FIG. 4 is a perspective view of the underside of the lid of FIG. 3.
Figure 5:
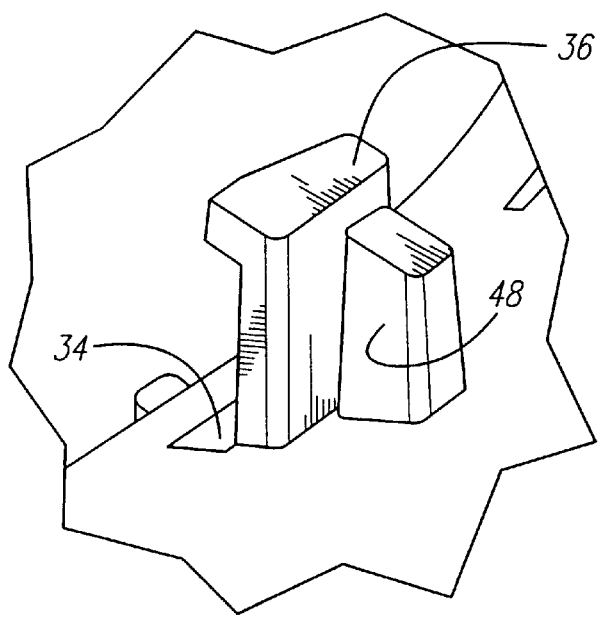
FIG. 5 is a detail view of a latch on the lid, taken about lines 5—5 of FIG. 4.

With reference now to the drawings, and particularly FIGS. 1 and 2, the present invention is preferably embodied in an improved illuminator assembly, generally referred to by the reference numeral 10, for providing light to a fiber optic lighting system for a swimming pool, a spa or the like. The illuminator consists of a housing assembly 12 mounted upon a base 14, from which bundles of fiber optic fibers extend to provide light to the swimming pool or any other area to be lighted. The housing assembly includes a circular lid 18 and a tubular window 20 that cooperatively enclose a light bulb 22 mounted in a socket 24. The light source assembly also includes a color wheel 26 mounted under the light bulb (see FIG. 9). The color wheel has several colored filters 28 which may be rotated into the path of the light coming from the light bulb. The color wheel and light source assembly are mounted to a support bracket 29, which connects to the base of the illuminator (see FIG. 7). As is well known in the art, a bundle of fiber optic fibers 16 is mounted under the color wheel and within the light path so that light passes through one of the colored filters to illuminate the swimming pool with light of a particular color. As will be described below the improved illuminator assembly has a number of advantages that make it user friendly, including a convenient spare light bulb holder, and the easy removal of the lid for access to the light bulb without the necessity of removing troublesome mechanical fasteners.

With reference now to FIGS. 3–7, the removable lid 18 of the illuminator 10 preferably has a dome-shaped upper surface with a hole 34 sized to accept the end of a standard screwdriver to release a latch 36 located on the underside 38 of the lid. The underside of the lid has a partially cylindrical mating wall 40 that extends downwardly to removably connect to an open upper end 42 of the window 20, which will be described in detail below. Preferably, two opposing "L"-shaped tabs 44 are located 180 degrees apart on the inside surface 46 of the mating wall. The latch is located in a gap in the mating wall and is adjacent to the screwdriver hole so that the end of a screwdriver can be used to pivot the latch outwardly to remove the lid of the illuminator. A support 48 located behind the latch limits the bending of the latch to prevent damage to the latch. The lid can be made of polycarbonate plastic or other suitable material.

The window 20 of the illuminator 10 can be made of transparent or translucent polycarbonate plastic to allow by-product light from the light bulb 22 to be used as walkway or landscape lighting. The window has a generally cylindrical wall 50 defining a large central passage for enclosing the light bulb socket 24 and light bulb 22. The window has a flanged bottom end 52 with screw holes 54. The flanged bottom is circular and is sized to mate with the bracket 29 that connects to the base 14 of the illuminator assembly. The circular upper end 42 of the window is configured to releasably mate with the mating wall 40 of the lid 18. In particular, the open upper end of the window is preferably sized to fit concentrically within the mating wall of the lid.

Two horizontally extending retaining tabs 58 are located 180 degrees apart on the outside surface 60 of the window's cylindrical wall 50, adjacent to its open upper end 42. When the lid 18 is installed on the window 20, the lid is rotated to locate the L-shaped tabs under the retaining tabs to prevent the lid from being lifted off of the window. The L-shaped tabs on the lid include vertical stop surfaces 62 that engage the retaining tabs on the window to limit the rotation of the lid in one direction when the tabs on the lid and the window are aligned. Thus, when the lid is twisted onto the window, it will not rotate past the point where the tabs 44 and 58 of the lid and the cover are in alignment. Below the tabs on the window, a circular flange 64 and an annular wall extend outwardly from the cylindrical wall of the window to act as a rain catch to prevent water from entering the inside of the illuminator. The cylindrical wall 50 of the window limits the downward travel of the lid's mating wall 40 to assure proper vertical positioning of the tabs on the window and the cover.

Figure 7:
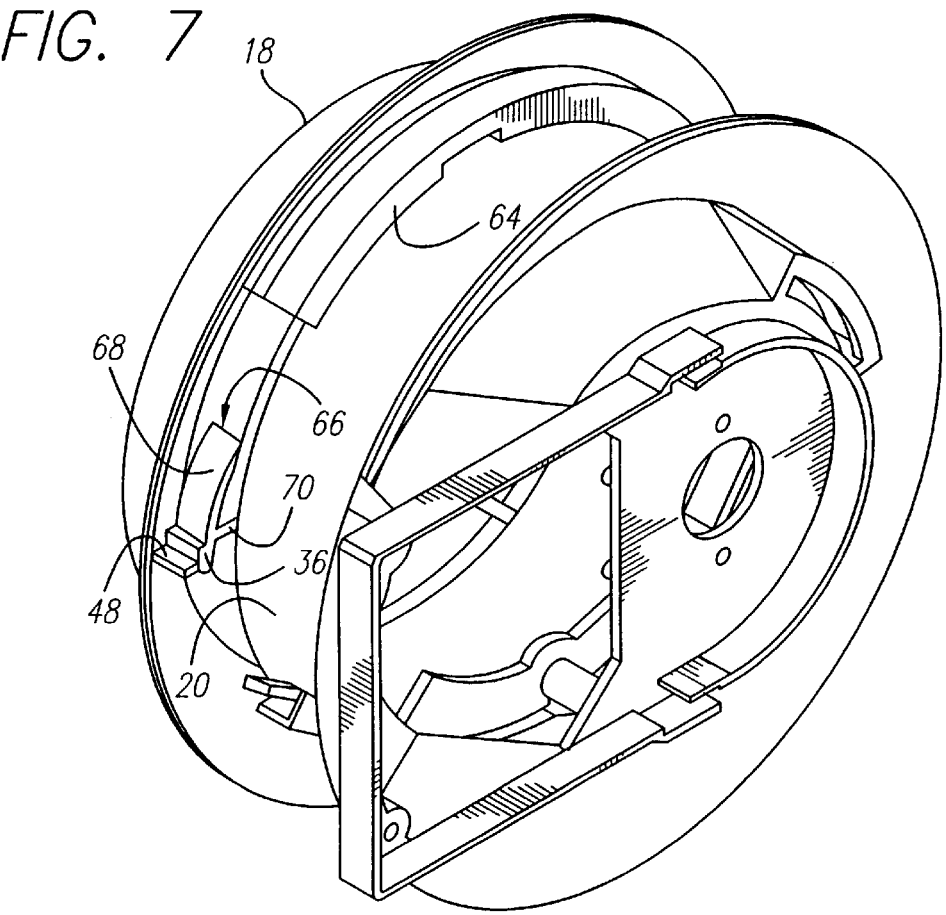
FIG. 7 is a perspective view of the light source assembly of the illuminator of FIG. 1, showing the latch of FIG. 5 engaged upon a projection on the window of FIG. 6.
Figure 8:
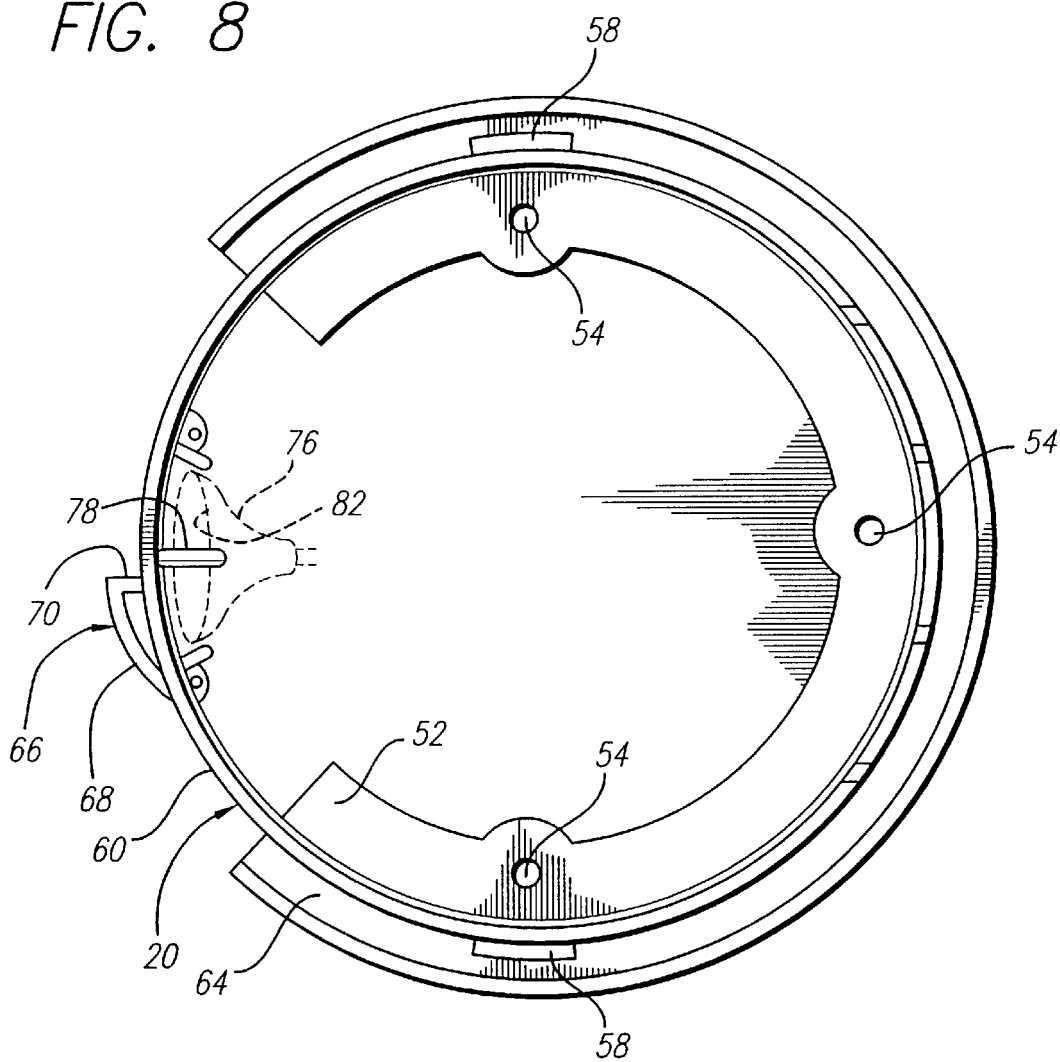
FIG. 8 is a top plan view of the window of FIG. 6.

With reference to FIGS. 7 and 8, a curved projection 66 also extends outwardly from the cylindrical wall 50 to engage the latch 36 on the lid 18. In this regard, the curved projection extends outwardly a distance sufficient to deform the latch as the lid is rotated onto the window 20. The projection has a curved surface 68 and a stop surface 70 extending radially inwardly from the curved surface to the wall of the window. As the latch engages the curved surface of the projection, it elastically deforms outwardly. When the latch has 10 passed by the projection, it is released by the stop surface and springs inwardly back to its original shape. At this point, the tabs 58 on the window preferably engage the stop surfaces 62 on the L-shaped tabs 44 of the lid 18 so that rotation of the lid is stopped. As shown in FIG. 7, when someone attempts to rotate the lid the opposite direction to remove the lid from the window, the latch abuts the stop surface, thereby advantageously preventing the removal of the lid by children or others who should not be disassembling the illuminator. As described above, a person who is knowledgeable regarding the illuminator 10 can remove the lid by inserting a standard screwdriver into the hole 34 in the lid and bending the latch outwardly so that it clears the stop surface of the projection as the lid is rotated in the opposite direction for removal from the window.

Figure 6:
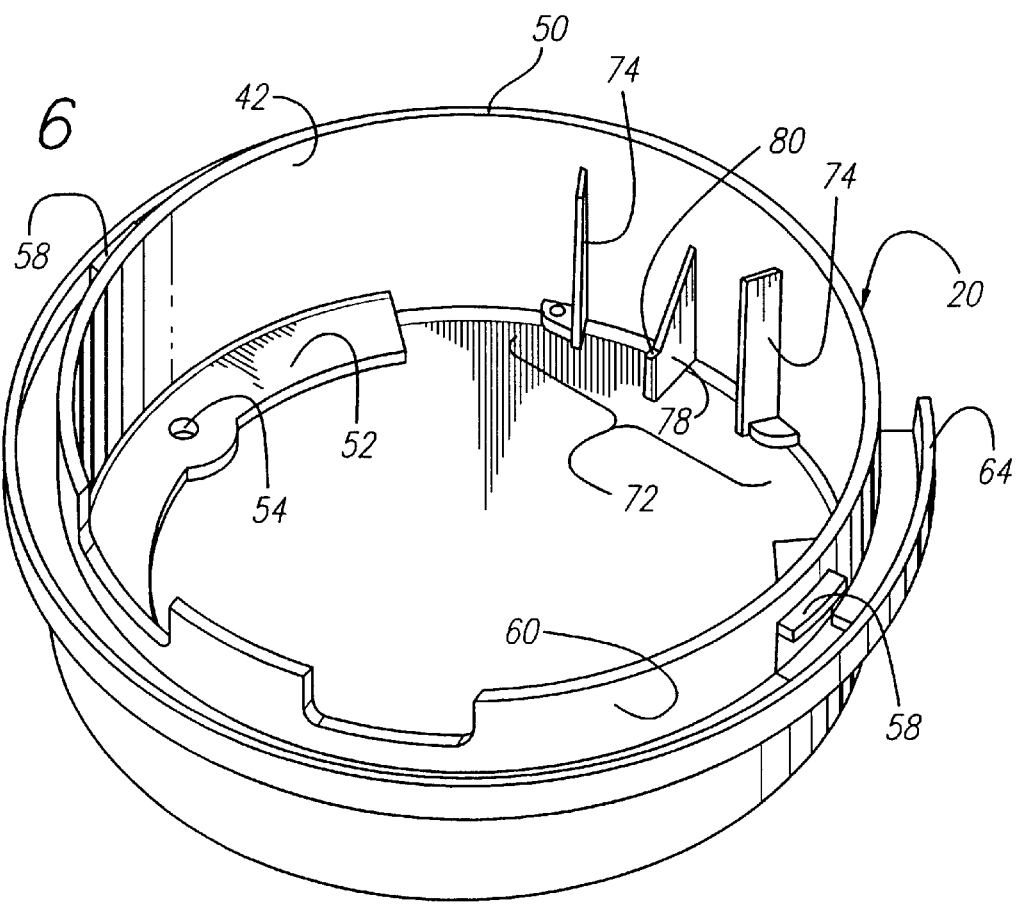
FIG. 6 is a perspective view of the window of the illuminator of FIG. 1.

With reference to FIGS. 6 and 8, the window 20 also features an internal holder 72 for a spare light bulb. The holder includes two vertical retaining walls 74 extending radially inwardly from the cylindrical wall 50 of the window. The retaining walls are located on planes that intersect in a vertical line located inside the window. In other words, the retaining walls point toward each other so that they partially enclose a reflector of the spare bulb 76 to hold the spare light bulb. A vertical support wall 78 is located midway between the retaining walls and has a catch surface 80 for the bottom edge 82 of the spare light bulb to rest upon. Accordingly, a pool owner can place a spare bulb in this holder so that when the light bulb in use burns out, a replacement is readily available for immediate installation.

Figure 10:
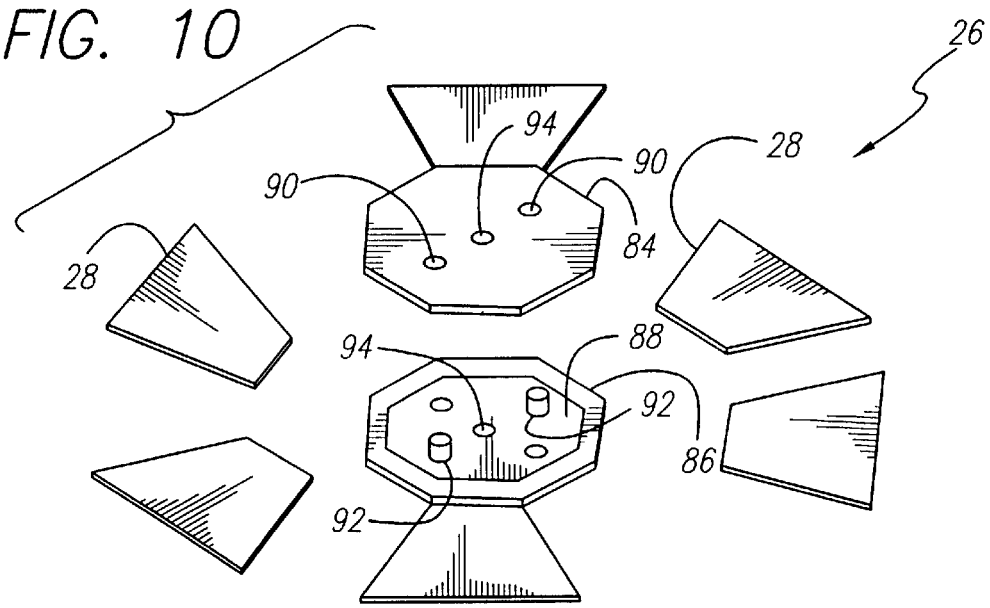
FIG. 10 is an exploded perspective view of the color wheel of FIG. 9.
Figure 9:
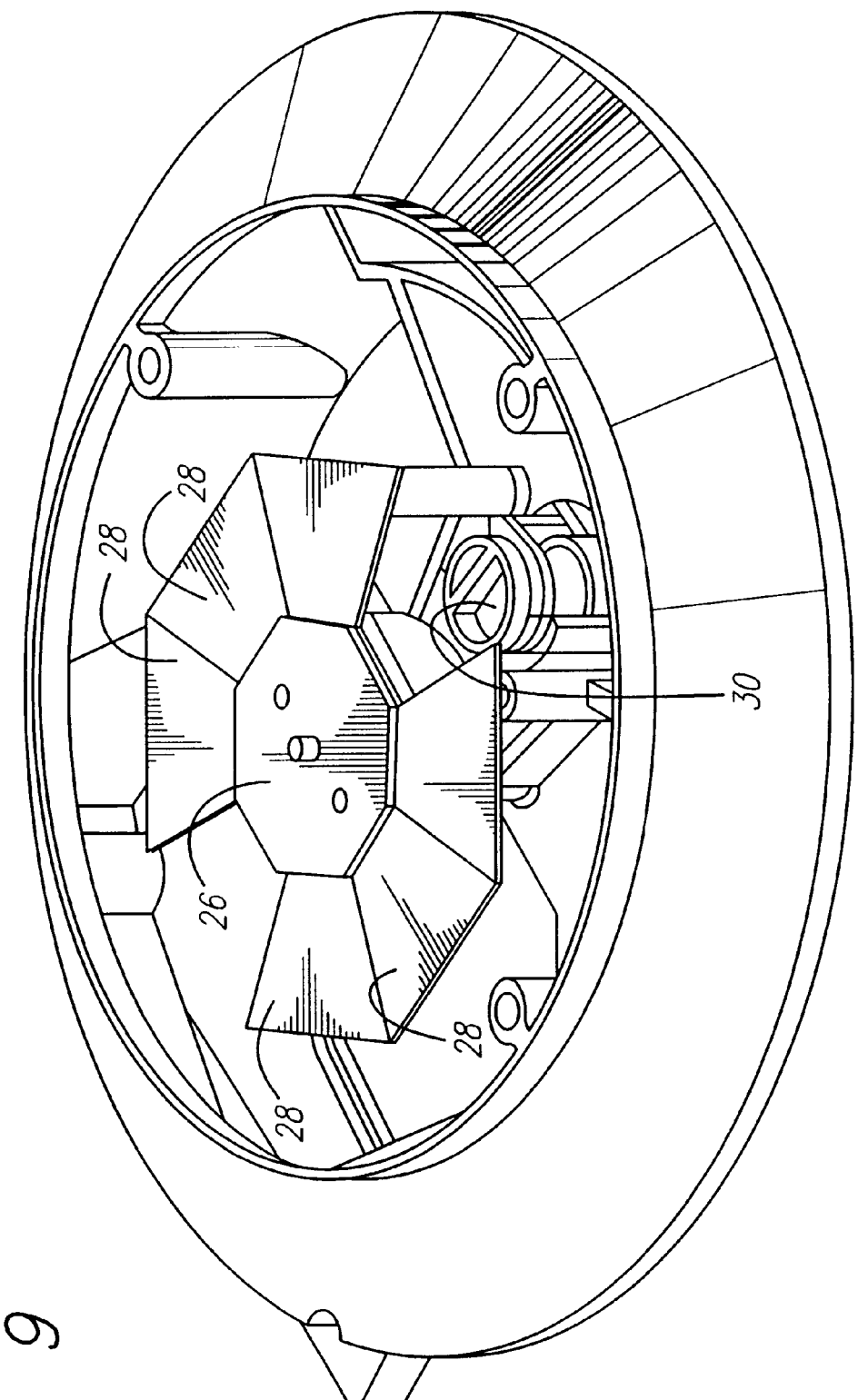
FIG. 9 is a perspective view of a color wheel from the illuminator of FIG. 1.

As shown in FIGS. 9 and 10, the color wheel 26 of the preferred illuminator 10 has a plurality of colored filters 28 mounted thereon. The color wheel preferably has an octagonal upper hub 84 and an octagonal lower hub 86 that support six trapezoidal color filters. Both hubs have raised center sections 88 that such that when assembled, a space is provided between the peripheries of the hubs for insertion of adhesive and the color filters without the need for disassembly of the hubs. The upper hub has two mating holes 90 that are sized to receive alignment pins 92 located on the center section of the lower hub. Both hubs have a center hole 94 through which a threaded shaft from an electric motor (not shown) extends.

As is well known in the art, the electric motor selectively rotates the color wheel to vary the color of the light in the pool. A mounting nut (not shown) engages the shaft above the center hole on the upper hub to secure the hubs to the shaft.

Each of the eight sides of the octagonal hubs 84 and 86 provides a location to hold a filter 28. Because six filters are installed at the factory, there are two spots available for the end user or the installer of the light system to install custom colored filters. The structure of the color wheel advantageously allows for such installation without the need for removal of any mechanical fasteners, which can be a difficult and laborious process, especially if the fasteners are lost while the color wheel is disassembled. In particular, to install a trapezoidal filter, the installer can simply put silicone adhesive on the small end of the filter and stick it between the hubs on one of their empty sides. When the adhesive cures, the custom filter will be permanently attached to the color wheel without resort to mechanical fasteners or tools.

Figure 11:
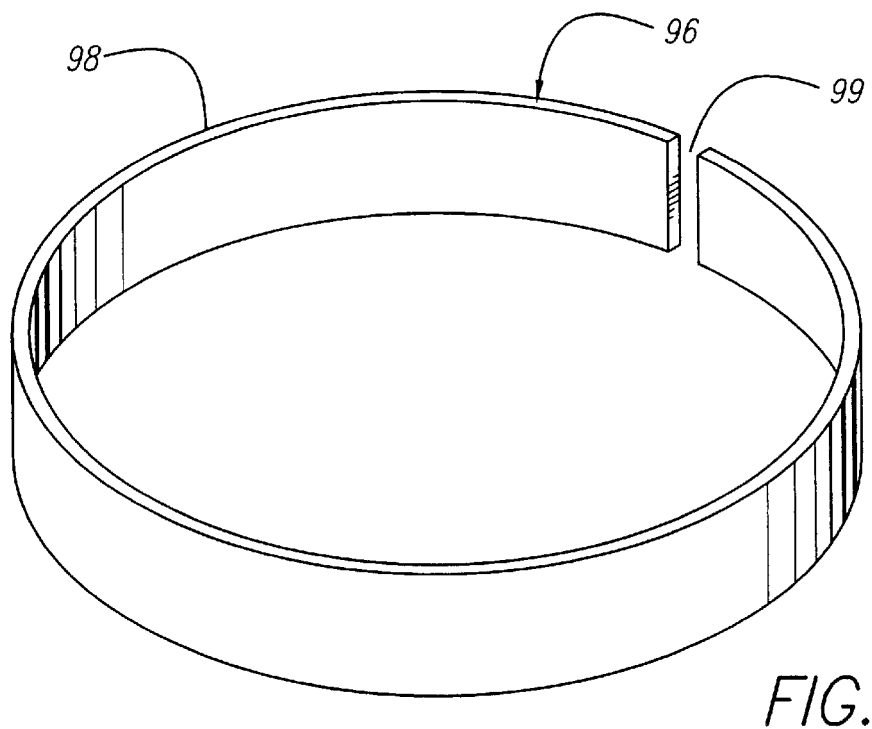
FIG. 11 is a perspective view of a filter for the window of FIG. 6.

As shown in FIG. 11, the preferred illuminator also includes an easily installable and removable filter 96 for the window. The filter has a cylindrical wall 98 parted by a longitudinal notch or slot 99. The filter is made of a PVC or other material, such as PVC or polycarbonaic plastic, with a sufficient modulus of elasticity to allow the filter to be elastically deformed when the cylindrical wall is pulled apart at the notch to slip over the outside of the window 20 of the illuminator 10. After it is installed, the filter resumes its original shape and partially or totally blocks the light coming from the window. This installation is advantageously conducted without the need for the removal of or reinstallation of mechanical fasteners.

While a particular form of the invention has been illustrated and described, it will be apparent that various modifications can be made without departing from the spirit and scope of the invention. Accordingly, it is not intended that the invention be limited, except as by the appended claims.

We claim:

1. A illuminator assembly for illuminating one end of a bundle of fiber optic fibers for a lighting system for a swimming pool or a spa, comprising:
    a hollow housing containing a light socket assembly for illuminating the end of the bundle of fiber optic fibers, the housing having an open upper end with the light socket assembly therein;
    a color wheel mounted between the light socket assembly and the bundle of fiber optic fibers, the color wheel having an upper hub and a lower hub having peripheral edges spaced apart a predetermined distance sized to accept a color filter therebetween without disassembly of the upper hub from the lower hub; and
    a lid sized to cover the open upper end of the housing.

2. The illuminator assembly of claim 1, wherein the housing includes a first tab mounted adjacent to the open upper end and another tab mounted adjacent to its open upper end and the lid includes a second tab configured and located to selectively engage the first tab on the housing upon a rotation of the lid with respect to the housing and another tab located to selectively engage the first tab on the housing upon the rotation of the lid with respect to the housing.

3. The illuminator assembly of claim 2, wherein the tabs on the lid are spaced 180 degrees apart.

4. The illuminator assembly of claim 1, further including a spare bulb holder mounted inside of the housing.

5. The illuminator assembly of claim 4, wherein the spare bulb holder includes two opposing side walls oriented along two planes that converge along a line remotely located from the walls, the walls spaced apart a distance sufficient to accept a spare bulb therebetween.

6. The illuminator assembly of claim 5, wherein the housing further includes a middle wall aligned with the side walls and located therebetween, the middle wall having a catch surface to support the spare bulb when it is located between the opposing side walls.

7. A illuminator assembly for illuminating one end of a bundle of fiber optic fibers for a lighting system for a swimming pool or a spa, comprising:
    a hollow housing containing a light socket assembly for illuminating the end of the bundle of fiber optic fibers, the housing having an open upper end with the light socket assembly therein and further including a first tab mounted adjacent to the open upper end;
    a light bulb mounted in the light socket assembly;
    a lid sized to cover the open upper end of the housing, the lid including a second tab configured and located to selectively engage the first tab on the housing upon a rotation of the lid with respect to the housing;
    a spare bulb holder mounted inside of the housing; and
    a color wheel mounted between the light bulb and the bundle of fiber optic fibers, the color wheel having an upper hub and a lower hub having peripheral edges spaced apart a predetermined distance sized to accept a color filter therebetween without disassembly of the upper hub from the lower hub.

8. A filter assembly for a light source housing assembly for illuminating one end of a bundle of fiber optic fibers for a lighting system for a swimming pool or a spa, comprising:
    a hollow housing containing a light socket assembly for illuminating the end of the bundle of fiber optic fibers, the housing having a window mounted adjacent to the light socket assembly to permit light not passing into the bundle of fiber optic fibers to pass through the window and illuminate the area around the housing; and
    a filter having a wall with a longitudinal notch along the longitudinal length of the wall, the wall sized to fit over the window and being elastically deformable such that the wall can be opened at the notch to pass around the window and resume its original shape such that the filter is installable on the window without the use of mechanical fasteners.

9. The filter of claim 8, wherein the wall is made of opaque material.

10. The filter of claim 8, wherein the window and the wall of the filter are cylindrical.

11. The illuminator assembly of claim 2, wherein the second tab is L-shaped and mounted on an inside surface of the lid, and the first tab is mounted on an outside surface of the housing, wherein the second tab is located under the first tab upon the rotation of the lid with respect to the housing.

12. An illuminator assembly for a swimming pool lighting system, the illuminator comprising:

a hollow housing having an outside surface and an inside surface, the housing includes,
 a first tab mounted on and extending from the outside surface of the housing, and
 a curved projection mounted on and extending from the outside surface of the housing; and
a lid sized to cover the open upper end of the housing, the lid includes,
 a second tab configured and located to selectively engage the first tab on the housing upon a rotation of the lid in a direction with respect to the housing, and
 a latch configured and located to selectively engage the curved projection and elastically deform outwardly upon the rotation of the lid in the direction with respect to the housing, and to spring inwardly as the latch passes the curved projection, whereby the lid is prevented from rotating in an opposite direction.

13. The illuminator assembly of claim 12, wherein the lid has a hole formed therethrough configured and located to accept a screwdriver to release the latch to allow rotating the lid in the opposite direction.

14. An illuminator assembly for illuminating an end of a bundle of fiber optic fibers for a lighting system for a swimming pool, the illuminator comprising:

a housing;

a light socket assembly located and configured inside the housing such that a light bulb mounted in the light socket assembly illuminates the end of the bundle of fiber optic fibers; and a color wheel mounted between the light socket assembly and the bundle of fiber optic fibers, the color wheel having an upper hub and a lower hub having peripheral edges spaced apart a predetermined distance sized to accept a color filter therebetween without disassembly of the upper hub from the lower hub.

15. The illuminator assembly of claim 14 further comprises:

a spare bulb holder, mounted inside the housing, for holding a spare bulb.

16. The illuminator assembly of claim 14 further comprises:

wherein the housing has a open upper end and an outside surface, the housing includes a first tab mounted on and extending from the outside surface of the housing;

a lid sized to cover the open upper end of the housing, the lid includes a second tab configured and located to selectively engage the first tab on the housing upon a rotation of the lid in a direction with respect to the housing.

17. The illuminator assembly of claim 16, wherein:

the hollow housing further has an inside surface and further includes a curved projection mounted on and extending from the outside surface of the housing; and the lid further includes a latch configured and located to selectively engage the curved projection and elastically deform outwardly upon the rotation of the lid in the direction with respect to the housing, and to spring inwardly as the latch passes the curved projection, whereby the lid is prevented from rotating in an opposite direction.

* * * * *

UNITED STATES PATENT AND TRADEMARK OFFICE
CERTIFICATE OF CORRECTION

PATENT NO. : 5,980,076

DATED : November 9, 1999

INVENTOR(S) : Dunn, Dennis C., et al.

It is certified that error appears in the above-identified patent and that said Letters Patent is hereby corrected as shown below:

On the title page: Item [56] "References Cited," please include the following patents:

| | | | |
|---|---|---|---|
| 2,344,370 | 3/1944 | Shapiro | 240/6.46 |
| 3,766,376 | 10/1973 | Sadacca et al. | 240/10 L |
| 3,813,514 | 5/1974 | Canty | 219/354 |
| 4,355,862 | 10/1982 | Kock | 350/96.2 |
| 4,556,280 | 12/1985 | Bagby | 350/96.16 |
| 4,611,600 | 9/1986 | Cohen | 128/667 |
| 4,679,895 | 7/1987 | Huber | 350/96.20 |
| 4,786,127 | 11/1988 | Molnar | 350/96.10 |
| 4,787,698 | 11/1988 | Lyons et al. | 350/96.20 |
| 4,850,669 | 7/1989 | Welker et al. | 350/96.20 |
| 4,887,875 | 12/1989 | Chang et al. | 350/96.21 |
| 5,058,985 | 10/1991 | Davenport et al. | 385/115 |
| 5,165,773 | 11/1992 | Nath | 362/32 |
| 5,185,837 | 2/1993 | Ayuta et al. | 385/81 |
| 5,268,977 | 12/1993 | Miller | 385/33 |

UNITED STATES PATENT AND TRADEMARK OFFICE
CERTIFICATE OF CORRECTION

PATENT NO. : 5,980,076
DATED : November 9, 1999
INVENTOR(S) : Dunn, Dennis C., et al.

It is certified that error appears in the above-identified patent and that said Letters Patent is hereby corrected as shown below:

References Cited," please include the following patents:

| | | | |
|---|---|---|---|
| 5,303,125 | 4/1994 | Miller | 362/32 |
| 5,315,684 | 5/1994 | Szegda | 385/139 |
| 5,486,984 | 1/1996 | Miller | 362/32 |
| 5,528,714 | 6/1996 | Kingstone et al. | 385/100 |

Signed and Sealed this

Twenty-third Day of May, 2000

*Attest:*

Q. TODD DICKINSON

*Attesting Officer*     *Director of Patents and Trademarks*